United States Patent
Bücker

(10) Patent No.: US 6,860,227 B2
(45) Date of Patent: Mar. 1, 2005

(54) PROCESS FOR THE ACTUATION OF A CARRYING AND WITHDRAWING DEVICE AS WELL AS A CARRYING AND WITHDRAWING DEVICE FOR MILKING UNITS

(75) Inventor: Heinz Bücker, Langenberg-Benteler (DE)

(73) Assignee: WestfaliaSurge GmbH, Oelde (DE)

( * ) Notice: Subject to any disclaimer, the term of this patent is extended or adjusted under 35 U.S.C. 154(b) by 0 days.

(21) Appl. No.: 10/327,238

(22) Filed: Dec. 20, 2002

(65) Prior Publication Data

US 2004/0118350 A1 Jun. 24, 2004

Related U.S. Application Data

(63) Continuation of application No. PCT/EP01/05376, filed on May 11, 2001.

(30) Foreign Application Priority Data

Jun. 21, 2000 (DE) .......................................... 100 30 408

(51) Int. Cl.[7] .................................................. A01J 3/00
(52) U.S. Cl. ................................ 119/14.02; 119/14.08
(58) Field of Search .......................... 119/14.02, 14.54, 119/14.1, 14.08, 14.18, 14.13

(56) References Cited

U.S. PATENT DOCUMENTS

| | | | | |
|---|---|---|---|---|
| 3,929,103 A | * | 12/1975 | Schluckbier | 119/14.08 |
| 4,056,077 A | * | 11/1977 | Schluckbier | 119/14.08 |
| RE29,848 E | * | 11/1978 | Schluckbier et al. | 119/14.08 |
| 4,188,910 A | * | 2/1980 | Hocker | 119/14.08 |
| 4,523,545 A | | 6/1985 | Kummer | |
| 4,586,462 A | * | 5/1986 | Icking | 119/14.1 |
| 4,741,287 A | * | 5/1988 | Kummer | 119/14.08 |
| 5,960,737 A | * | 10/1999 | Larson et al. | 119/14.08 |
| 6,240,878 B1 | * | 6/2001 | Larson et al. | 119/14.08 |

FOREIGN PATENT DOCUMENTS

| | | |
|---|---|---|
| DE | 1 278 166 | 6/1966 |
| DE | 34 06 878 C1 | 2/1984 |
| WO | WO 96/13150 | 8/1995 |

OTHER PUBLICATIONS

English translation of Bucker (WO 96/13150).

* cited by examiner

Primary Examiner—Robert P. Swiatek
Assistant Examiner—Joan M. Olszewski
(74) Attorney, Agent, or Firm—Smith Moore LLP

(57) ABSTRACT

The invention relates to the actuation of a carrying and withdrawing device for milking units, a process is proposed in which for the attachment of the milking unit a downwardly directed additional force acts on the counterweight during a primary milking phase no additional force acts on the counterweight, and, during at least one secondary milking phase, an upwardly directed additional force acts on the counterweight.

22 Claims, 3 Drawing Sheets

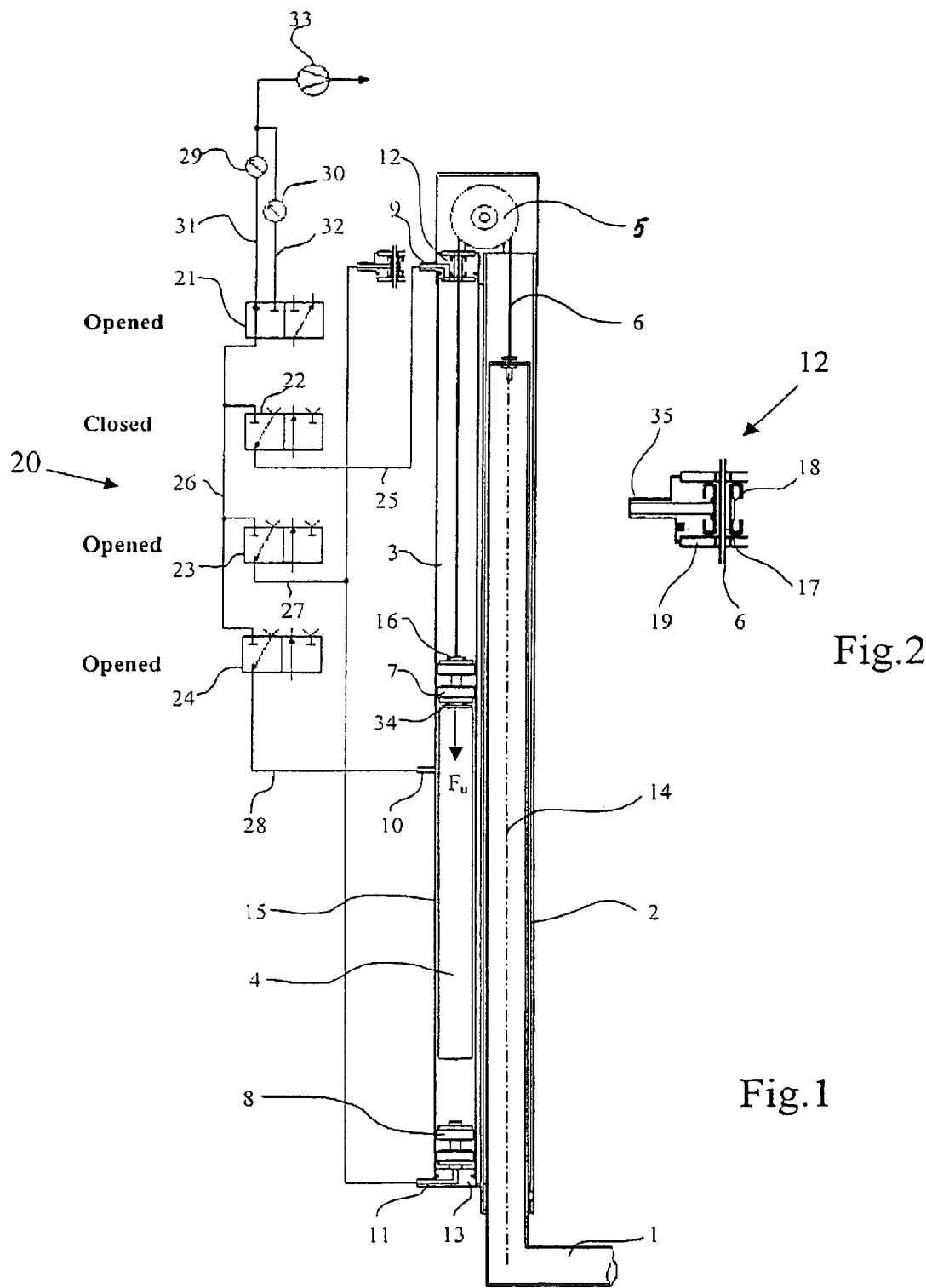

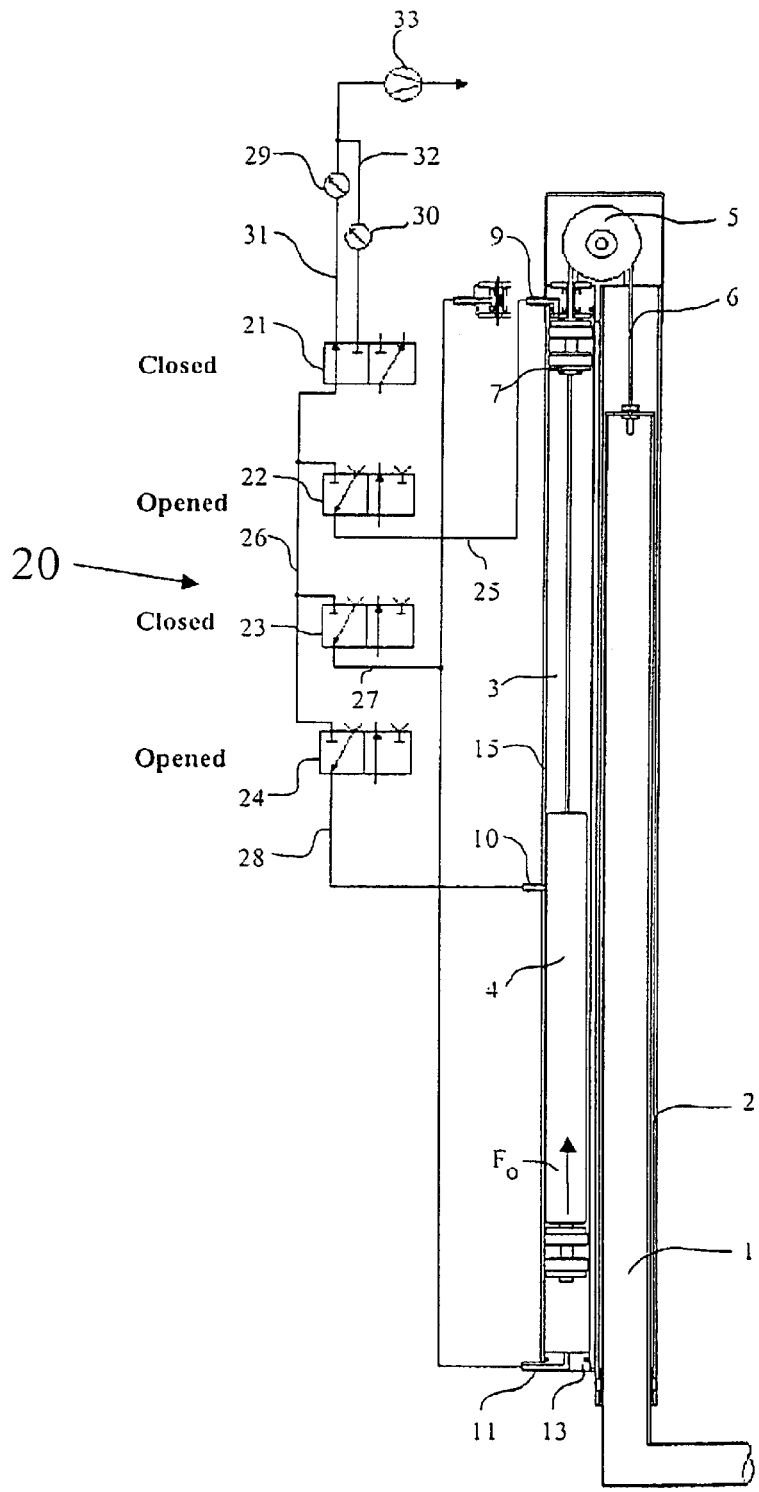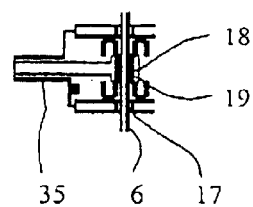
Fig.5
Fig.4

PROCESS FOR THE ACTUATION OF A CARRYING AND WITHDRAWING DEVICE AS WELL AS A CARRYING AND WITHDRAWING DEVICE FOR MILKING UNITS

This application is a continuation of International Application No. PCT/EP01/05376, internationally filed May 11, 2001.

The object of the invention relates to a process for the actuation of a carrying and withdrawing device for milking units as well as to a carrying and withdrawing device for milking units.

A carrying and withdrawing device for milking units is disclosed in DE 34 06 878 C1. This carrying and withdrawing device has a stationary, vertical main column as well as a carrier for holding the milking unit. The carrier can be moved along a longitudinal axis of the main column and can be pivoted about it. Inside of the carrier, which is formed as a tube, a counterweight is provided for counterbalancing the weight of the same. Under the main column, a clamping piece is disposed encircling the carrier tube, said clamping piece in the horizontal position not hindering the free movement of the carrier, where two suspension points of the clamping piece lying opposite one another are connected, via an axially elastic element and an axially rigid element on one side and a work cylinder furnished with a piston rod on the other side, to suspension points on the main column and to the suspension point present on a strut of the main column. Through this development of the carrying and withdrawing device the possibility is created that the carrier executes a combined lowering/turning motion so that an oblique tug is imparted to the udder of the cow.

A further development of a carrying and withdrawing device is disclosed in WO 96/13150. The carrier of this carrying and withdrawing device is, including a horizontal extended arm, counterbalanced by a counterweight in such a manner that, on one side, the carrier, including the horizontal extended arm on which the milking unit is disposed, and, on the other side, the counterweight are hung at each end of a rope running over a pulley, and thus the carrier and the horizontal extended arm can be freely rotated horizontally and freely displaced vertically over a certain range. Thus, when the cow changes its position during the milking process, the milking unit hung on the extended arm tracks the change without noteworthy forces acting.

The milking process for a cow can be divided into a primary milking phase and a secondary milking phase. During the secondary milking phase the danger arises that the milking unit may drift up in the direction of the udder so that here a reduction of the willingness of the cow to be milked can result. In order to prevent the milking unit from drifting up, a vertically downwardly directed force is exerted on it. This is achieved according to WO 96/13150 by a clamping device being actuated via a work cylinder which in the particular position acts by friction on the rope leading to the counterweight. In so doing, the work cylinder is disposed above the vertical main column. The clamping device must be manufactured very precisely since must be insured by it that the action of the counterweight is cancelled. The clamping device is a clamping piece, which has a penetrating opening through which the rope is extended. If the clamping piece is moved from its starting position, then the rope is clamped by the oblique position of the clamping piece. This leads to abrasion of the rope, whereby the service lifetime of the rope is reduced.

This carrying and withdrawing device, however, has the disadvantage that the service effort in replacing the sliding rope and the clamping device is relatively high.

BRIEF SUMMARY OF THE PRESENT INVENTION

Proceeding from this, the goal set for the present invention is to specify a process for the actuation of a carrying and withdrawing device, through which the effort in actuating the carrying and withdrawing device is reduced. A further goal of the present invention is to extend the known carrying and withdrawing device so that it has a longer service lifetime.

The process for the actuation of a carrying and withdrawing device for milking units, which has a stationary, vertical main column, a carrier for holding the milking unit wherein the carrier can be moved along a longitudinal axis of the main column and can pivot about it, and a counterweight which is connected to the carrier and can be moved in a direction opposite to the direction of movement of the carrier, is distinguished by the fact that, for the attachment of the milking unit a downwardly directed additional force acts on the counterweight, during a primary milking phase no additional force acts on the counterweight, and during at least one secondary milking phase an upwardly directed additional force acts on the counterweight. Due to the fact that for the attachment of the milking unit a downwardly directed additional force acts on the counterweight, the handling of the milking unit is simplified, since for the milker who applies the milking unit to the teats of the animal, the expenditure of force for lifting the milking unit together with the carrier is reduced.

During the primary milking phase there is no action by additional forces on the counterweight. Thereby the possibility is opened up that if the animal moves with the milking unit attached, the carrier can follow this motion without forces, in particular tractive forces, from the milking unit acting on the udder.

In order to prevent, during a secondary milking phase, the milking cups of the milking unit from drifting up the teats, an upwardly directed additional force is applied to the counterweight. Thereby a downward motion of the carrier results so that a tractive force is exerted on the milking unit, said tractive force preventing the milking cup from drifting in the direction of the udder of the animal to the teats.

According to an advantageous extension of the process it is proposed that the downwardly and/or upwardly directed force is produced by the action of at least one pneumatically actuated piston. Through this management of the process, the force which acts on the counterweight can be adjusted with relative precision. The action of the force can also be adjusted individually for each animal, if the animal and the carrying and withdrawing device are provided with an appropriate recognition device. The use of a pneumatically actuated piston also has the advantage that it is possible to rely on an existing air pressure system of the milking parlor.

For the simplification of the management of the process it is proposed that the downwardly directed force be produced by the action of an upper pneumatically actuated piston and the upwardly directed force be produced through the action of a lower pneumatically actuated piston. In that case, a development of the process is preferred in which the upper piston and the lower piston can be actuated independently of one another.

According to another further advantageous development of the process it is proposed that the upper piston can be traversed into an upper final position and the lower piston can be traversed into a lower final position so that in their final positions the counterweight is free of effective connection with the piston. In this position of the piston no additional force acts on the counterweight. The counterweight can be moved essentially without friction inside of a chamber in which the counterweight is disposed.

The additional forces acting on the counterweight can be different with respect to magnitude and/or duration of action. However, a process management is preferred in which the counterweight is acted on with an essentially constant force. The duration of the action of the additional force can be adjusted by corresponding specifications. They can also vary. The variation of the duration of the action of the forces is also dependent on the animal to be milked. The carrying and withdrawing device can be provided with additional sensors or switches so that the action of the force on the counterweight can be triggered by the milker. This can then be cancelled after the application of the milking unit to the teats of the udder so that another run of the process is started.

According to a further inventive concept, a carrying and withdrawing device for milking units, which has a stationary vertical main column, a carrier for the holding of the milking unit, where the carrier can be moved along a longitudinal axis of the main column and can pivot about it, and a counterweight which is connected to the carrier and can be moved with a direction opposite to the direction of motion of the carrier, is proposed where a chamber is provided which has an upper fluid connection, a lower fluid connection, and a fluid connection lying between the upper and lower fluid connections. The counterweight is disposed in the chamber. It is disposed so that an upper piston is provided above the counterweight and a lower piston is provided below the counterweight. The carrying and withdrawing device has a control unit for the control of the fluid pressure in the chamber. By means of this development, according to the invention, of the carrying and withdrawing device, a relatively compact layout is achieved. A further advantage of the carrying and withdrawing device according to the invention consists of the fact that, in contradistinction to the carrying and withdrawing device according to WO 96/13150, no wear on a rope occurs.

According to an advantageous development of the carrying and withdrawing device according to the invention it is proposed that a flexible connecting element, which could, for example, be a rope, is provided which connects the counterweight with the carrier. The connecting element extends through a channel in the cover of the chamber and through to the upper piston. The flexible connecting element is advantageously disposed in the center of the carrier as well as of the counterweight so that horizontal pivoting of the carrier without righting moment is made possible.

To avoid loss of pressure as a function of the placement of the upper piston, it is proposed according to a further advantageous development of the carrying and withdrawing device according to the invention that the upper piston and/or the cover are/is so formed so that a seal encircling the opening of the channel is formed when the upper piston lies on the cover. Preferably the cover and/or the upper piston have/has at least one sealing element.

Since the flexible connecting element extends through the cover, it is proposed that the cover have at least one seal encircling the connecting element. Preferably, the seal is formed as a tube of an elastic material. In particular, it is proposed that the cover have an annular receiving space whose inner wall is formed by the seal where the receiving space can be pressurized with a fluid. If, for example, low pressure is produced in the receiving space, then the seal formed as a tube comes to lie the flexible connecting element so that a seal is achieved. This action is also achieved when the receiving space is pressurized with a low pressure. In such a case, the seal is pressed against the flexible connecting element.

According to still another advantageous development of the carrying and withdrawing device, a control unit with valves is proposed. Therein a valve is disposed in a line which connects a main line to the upper fluid connection. An additional valve is disposed in a line which connects a main line to the lower fluid connection. Furthermore, a valve is disposed in a line which connects the main line to the middle fluid connection. The main line can be pressurized at different pressures. These pressures are understood not to include those which are above atmospheric pressure but instead only those which are below atmospheric pressure, so that a low pressure is present in the main line.

BRIEF DESCRIPTION OF THE DRAWINGS

FIG. 1 is a schematic view of a carrying and withdrawing device for milking units in accordance with the present invention.

FIG. 2 is a schematic view of a cover for a carrying and withdrawing device for milking units in accordance with the present invention.

FIG. 4 is a schematic view of the carrying and withdrawing device of FIG. 1 wherein the pistons are in a position they assume during a secondary milking phase.

FIG. 5 is a schematic view of a cover for a carrying and withdrawing device with a seal during the secondary milking phase in accordance with the present invention.

DETAILED DESCRIPTION OF THE PREFERRED EMBODIMENTS

Figure 3:
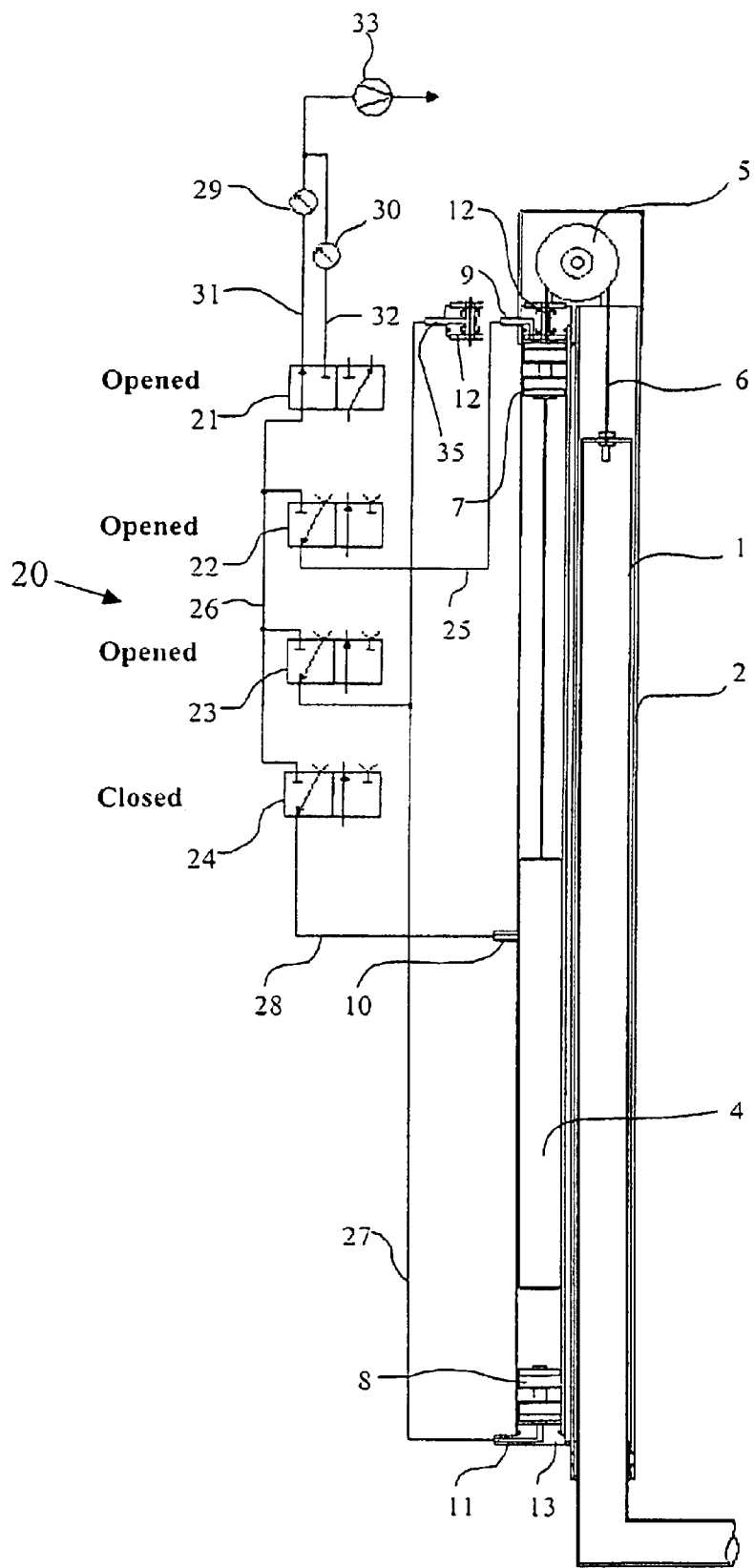
FIG. 3 is a schematic view of the carrying and withdrawing device of FIG. 1 wherein the pistons are in a position they assume during the primary milking phase.

The carrying and withdrawing device of the present invention has a stationary, main column 2 running vertically. Inside of the main column 2 a carrier 1 is slidingly disposed. The carrier 1 serves to hold the milking unit. The carrier 1 can be moved along a longitudinal axis 14 of the main column. It can also be pivoted about the longitudinal axis 14.

A counterweight 4 is connected to the carrier 1. The counterweight 4 can be moved in a vertical direction opposite to the direction of movement of the carrier 1. The counterweight 4 and the carrier 1 are connected by means of a flexible connecting element 6. The flexible connecting element 6 is preferably a rope. Above the main column 2, a pulley 5 is rotatably mounted, over which the flexible connecting element 6 is guided.

The counterweight 4 is disposed in a chamber 3. The chamber 3 is bounded by a cylindrical body 15, a cover 12, and a base 13. An upper piston 7 is disposed above the counterweight 4. A lower piston 8 is provided below the counterweight 4. The upper piston 7 and the lower piston 8 are independent of one another and can be moved relative to one another within the chamber 3.

The chamber 3 has an upper fluid connection 9. As can be seen from FIG. 1, the fluid connection 9 is formed in the cover 12. It has an opening which is formed in a side of the cover 12. In the base 13 a lower fluid connection 11 is formed. Between the upper and the lower fluid connection 9, 11 an additional fluid connection 10 is provided.

The upper piston 7 has a penetrating opening not shown through which the flexible element 6 extends. An essentially annular sealing element 16 is provided on the face, facing the cover 12, of the upper piston 7.

FIG. 2 shows the structure of the cover 12 enlarged. The cover 12 has a penetrating channel 17 through which the flexible connecting element 6 extends. The flexible connecting element 6 also extends through a seal 19 encircling the flexible connecting element 6. The seal 19 is formed as a tube. Within the cover 12 an annular receiving space 18 is provided whose inner wall is formed by the seal 19. A line connection 35 communicates with the receiving space 18 so that the receiving space 18 can be pressurized with a fluid.

A control unit for the control of fluid pressure in the chamber 3 is denoted by the reference number 20. The control unit 20 has several valves 21 to 24. The valve 22 is disposed in a line 25. This line 25 connects a main line 26 to the upper fluid connection 9. The valve 23 is disposed in a line 27 which connects the main line 26 to the lower fluid connection 11 as well as to the line connection 35. The additional valve 24 connects the main line 26 through a line 28 to the middle fluid connection 10.

In the main line 26 the valve 21 is disposed, through which the main line 26 can be pressurized at different pressures. For this, in front of the valve 21 as seen in the direction of flow, a first pressure regulation valve 29 and a second pressure regulation valve 30 are provided, which are disposed respectively in a line 31, 32. The lines 31, 32 are connected to a pressure source 33.

For the relief of physical stress on the person milking, a force $F_U$ directed downwards is exerted by the piston 7 on the counterweight 4 so that the carrier 1 with the milking unit is traversed upwards. The force $F_U$ is generated by the valve 21 being turned on so that a pressure, preset by the pressure regulation valve 30, prevails in the main line 26. In the embodiment example shown, low pressure is present in the main line 26. The valve 22 is closed so that atmospheric pressure is present in the chamber 3 above the upper piston 7. The valve 23 is switched on so that the low pressure prevailing in the main line 26 is conducted via the line 27 and the lower fluid connection 11 into the chamber 3 so that the lower piston 8 assumes its final position shown in FIG. 1. Due to the line 27, low pressure also prevails in the receiving space 18 so that the tubular seal 19 does not lie on the flexible connecting element 6. The flexible connecting element 6 is guidable through the cover essentially without friction.

The valve 24 is switched on so that the low pressure prevailing in the main line 26 is conducted via the line 28 and the middle fluid connection 10 into the chamber 3 whereby the piston 7 is sucked downwards. In so doing, the piston 7 comes to lie on the counterweight 4. It exerts a force $F_U$ on the counterweight 4. Since the flexible element 6 also extends through the upper piston 7, it has, to avoid leaks, a seal 34 which comes to lie on a face of the counterweight 4. The magnitude of the force $F_U$ is a function of the low pressure set in the main line 26 by pressure regulation valve 30.

If the application of the milking unit to the teats of the animal has been done by the milker, then the control unit 20 controls the valves accordingly. FIG. 3 shows a snapshot which prevails during the milking phase. During this primary milking phase the pistons 7, 8 exert no force on the counterweight 4. The layout of the carrying and withdrawing device shown in FIG. 3 corresponds in principle to the layout of the carrying and withdrawing device according to FIG. 1.

During the primary milking phase free mobility of the counterweight 4 is permitted. This is achieved by the upper piston 7 assuming its upper final position, as shown in FIG. 3. In addition, the lower piston 8 is located in its lower final position.

For carrying the piston 7 from the position in which it lies on the counterweight 4 into the position shown in FIG. 3, the valve 22 is opened and the valve 24 closed. By the opening of the valve 22, low pressure is applied in the chamber 3 via the line 25 and the upper fluid connection 9. Since low pressure does not then prevail at the fluid connection 10, but rather atmospheric pressure, the upper piston 7 is traversed away from the counterweight 4 upwards into the upper final position. In the upper final position of the upper piston 7 the sealing element 16 lies on the face of the cover 12 so that a seal with respect to the surrounding atmosphere is achieved.

During the travel of the upper piston 7 the seal of the connecting element 6 is opened, whereby a certain leakage is present which, however, is so small that it is accepted in the bargain. This leakage can, however, be avoided by atmospheric pressure being present during the travel of the piston 7 so that the seal 19 lies on the connecting element 6. If the upper piston 7 has reached its upper final position, then low pressure can once again be present in the receiving space 18 so that the seal 19 releases the connecting element 6.

If a movement of the animal occurs during the primary milking phase, said movement being transferred via the milking unit to the carrier 1, then the counterweight 4 can move freely since neither the upper piston 7 nor the lower piston 8 acts on the counterweight.

If the primary milking phase has ended and the secondary milking phase has been initiated, then a force $F_O$ is exerted by the lower piston 8 on the counterweight 4 whereby the counterweight 4 is pushed upwards. This has as a consequence the fact that the carrier 1 moves downwards and exerts a tractive force on the milking unit so that the milking cups of the milking unit do not drift up to the teats. This situation is shown in FIG. 4. Therein the valve 21 is switched off so that the main line 26 is connected to the line 31 in which the low pressure set by the pressure regulation valve 29 prevails. The valve 22 is switched on in addition. The upper piston 7 remains in its upper final position. The valve 23 is switched off so that atmospheric pressure is present via the lower fluid connection 11. Atmospheric pressure is also present in the receiving space 18 of the cover so that the seal 19 lies on the flexible connecting element 6.

The valve 24 is switched on so that low pressure is present in the chamber 3 through the fluid connection 10. Thereby the piston 8 is moved upwards. It lies on the counterweight 4 and presses it upwards so that the carrier 1 moves downwards.

List of Reference Numbers

1 Carrier
2 Main column
3 Chamber
4 Counterweight
5 Pulley
6 Connecting element
7 Upper piston
8 Lower piston
9, 10, 11 Fluid connection
12 Cover
13 Base
14 Longitudinal axis
15 Body
16 Sealing element
17 Channel
18 Receiving space
19 Seal
20 Control unit 21–24 Valves
25 Line
26 Main line
27, 28 Line
29, 30 Pressure regulation valve
31, 32 Line
33 Pressure source
36 Seal

What is claimed is:

1. A process for the actuation of a carrying and withdrawing device for a milking unit having a stationary, vertical main column comprising the steps of:
providing a carrier for holding the milking unit, wherein the carrier is movable along a longitudinal axis of the main column and pivotable about the longitudinal axis;
providing a counterweight which is connected to the carrier and is movable in a direction opposite to the direction of motion of the carrier;
attaching the milking unit by providing a downwardly directed additional force on the counterweight,
providing no additional force on the counterweight during a primary milking phase; and
providing an upwardly directed additional force on the counterweight during at least one secondary milking phase.

2. A process according to claim 1, further comprising the step of producing the downwardly and/or upwardly directed force by actuating at least one pneumatically actuated piston.

3. A process according to claim 2, further comprising the steps of producing the downwardly directed force by actuating an upper pneumatically actuated piston, and producing the upwardly directed force by actuating a lower pneumatically actuated piston.

4. A process according to claim 3, further comprising the step of actuating the upper piston and the lower piston independently of each other.

5. A process according to claim 3, further comprising the step of traversing the upper piston into an upper final position and traversing the lower piston into a lower final position so that in their final positions the counterweight is free of effective connection to the pistons.

6. A carrying and withdrawing device for a milking unit comprising:
a stationary vertical main column;
a carrier for holding the milking unit, wherein the carrier can be moved along a longitudinal axis of the main column and can be pivoted about the longitudinal axis;
a counterweight that is connected to the carrier and can be moved in a direction opposite to the direction of motion of the carrier;
a chamber comprising an upper fluid connection, a lower fluid connection, and a fluid connection lying in between the upper fluid connection and lower fluid connection; and
a control unit for controlling a fluid pressure in the chamber,
wherein the counterweight is disposed in the chamber between an upper piston and a lower piston.

7. A carrying and withdrawing device according to claim 6, further comprising a flexible connecting element that connects the counterweight to the carrier and wherein the flexible connecting element extends through a channel in a cover of the chamber and through the upper piston.

8. A carrying and withdrawing device according to claim 7, wherein the upper piston and/or the cover are/is formed so that when the upper piston lies on the cover a seal encircling the opening of the channel is formed.

9. A carrying and withdrawing device according to claim 8, wherein the cover and/or the upper piston have/has at least one sealing element.

10. A carrying and withdrawing device according to claim 7, wherein the cover has at least one seal encircling the flexible connecting element.

11. A carrying and withdrawing device according to claim 10, wherein the seal is constructed in the form of a tube from an elastic material.

12. A carrying and withdrawing device according to claim 11, wherein the cover has an annular receiving space whose inner wall is formed by the seal such that the receiving space can be pressurized by a fluid.

13. A carrying and withdrawing device according to claim 12, wherein the control unit comprises a plurality of valves:
wherein a first valve is disposed in a first line which connects a main line to the upper fluid connection,
wherein a second valve is disposed in a second line which connects a main line to the lower fluid connection,
wherein a third valve is disposed in a third line which connects a main line to the middle fluid connection, and
wherein the main line can be pressurized at different pressures.

14. A carrying and withdrawing device according to claim 13, wherein the second line is further connected to the receiving space.

15. A carrying and withdrawing device for a milking unit comprising:
a stationary, vertical main column;
a carrier for holding the milking unit, wherein the carrier is movable along a longitudinal axis of the main column and pivotable about the longitudinal axis;
a counterweight which is connected to the carrier and is movable in a direction opposite to the direction of motion of the carrier;
a mechanism for providing a downwardly directed additional force on the counterweight for attaching the milking unit,
providing no additional force on the counterweight during a primary milking phase; and,
a mechanism for providing an upwardly directed additional force on the counterweight during at least one secondary milking phase.

16. A process according to claim 4, further comprising the step of traversing the upper piston into an upper final position and traversing the lower piston into a lower final position so that, in their final positions, the counterweight is free of effective connection to the pistons.

17. A carrying and withdrawing device according to claim 6, wherein the control unit comprises a plurality of valves:
wherein a first valve is disposed in a first line which connects a main line to the upper fluid connection,
wherein a second valve is disposed in a second line which connects a main line to the lower fluid connection,
wherein a third valve is disposed in a third line which connects a main line to the middle fluid connection, and
wherein the main line can be pressurized at different pressures.

18. A carrying and withdrawing device according to claim 7, wherein the control unit comprises a plurality of valves:
wherein a first valve is disposed in a first line which connects a main line to the upper fluid connection, wherein a second valve is disposed in a second line which connects a main line to the lower fluid connection, wherein a third valve is disposed in a third line which connects a main line to the middle fluid connection, and wherein the main line can be pressurized at different pressures.

19. A carrying and withdrawing device according to claim 8, wherein the control unit comprises a plurality of valves:

wherein a first valve is disposed in a first line which connects a main line to the upper fluid connection, wherein a second valve is disposed in a second line which connects a main line to the lower fluid connection, wherein a third valve is disposed in a third line which connects a main line to the middle fluid connection, and wherein the main line can be pressurized at different pressures.

20. A carrying and withdrawing device according to claim 9, wherein the control unit comprises a plurality of valves:

wherein a first valve is disposed in a first line which connects a main line to the upper fluid connection, wherein a second valve is disposed in a second line which connects a main line to the lower fluid connection, wherein a third valve is disposed in a third line which connects a main line to the middle fluid connection, and wherein the main line can be pressurized at different pressures.

21. A carrying and withdrawing device according to claim 10, wherein the control unit comprises a plurality of valves:

wherein a first valve is disposed in a first line which connects a main line to the upper fluid connection, wherein a second valve is disposed in a second line which connects a main line to the lower fluid connection, wherein a third valve is disposed in a third line which connects a main line to the middle fluid connection, and wherein the main line can be pressurized at different pressures.

22. A carrying and withdrawing device according to claim 11, wherein the control unit comprises a plurality of valves:

wherein a first valve is disposed in a first line which connects a main line to the upper fluid connection, wherein a second valve is disposed in a second line which connects a main line to the lower fluid connection, wherein a third valve is disposed in a third line which connects a main line to the middle fluid connection, and wherein the main line can be pressurized at different pressures.

* * * * *

UNITED STATES PATENT AND TRADEMARK OFFICE
CERTIFICATE OF CORRECTION

PATENT NO. : 6,860,227 B2
DATED : March 1, 2005
INVENTOR(S) : Heinz Bücker

It is certified that error appears in the above-identified patent and that said Letters Patent is hereby corrected as shown below:

Column 8,
Line 42, change the "," to -- ; --.

Signed and Sealed this

Twenty-seventh Day of September, 2005

JON W. DUDAS
*Director of the United States Patent and Trademark Office*